(No Model.) 2 Sheets—Sheet 1.

F. GRUBER.
PROPELLING DEVICE FOR VEHICLES.

No. 578,329. Patented Mar. 9, 1897.

WITNESSES:
Wm. H. Canfield, Jr.
Marcy Z. Trusdell

INVENTOR:
FRANK GRUBER,
BY Fred C. Fraentzel,
ATTORNEY (No Model.) 2 Sheets—Sheet 2.
F. GRUBER.
PROPELLING DEVICE FOR VEHICLES.
No. 578,329. Patented Mar. 9, 1897.
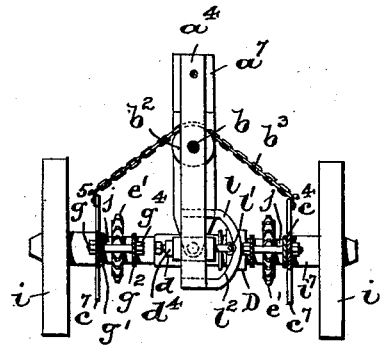
FIG. 4
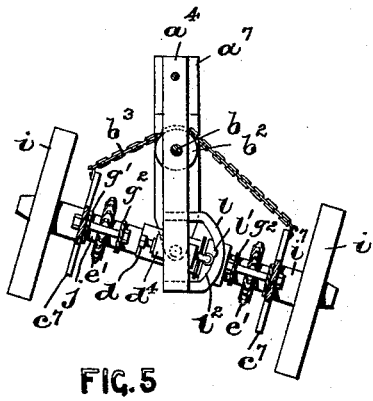
FIG. 5
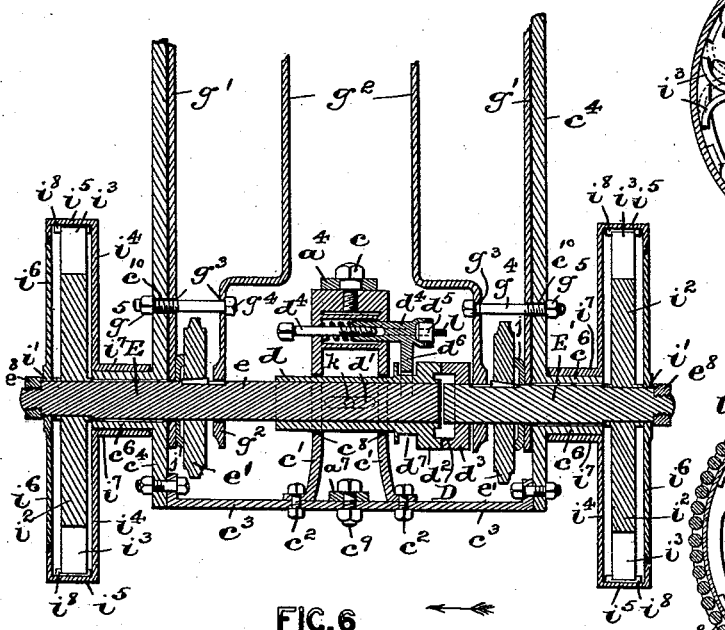
FIG. 6
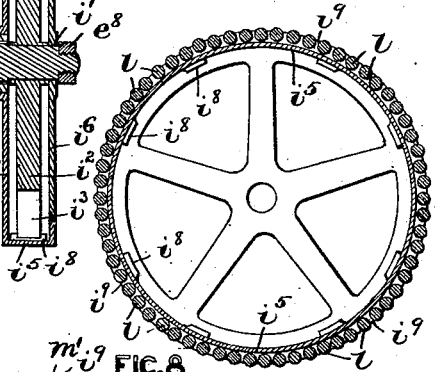
FIG. 7
FIG. 8
FIG. 9
WITNESSES:
Wm. H. Camfield, Jr.
Marcy J. Dinsdell
INVENTOR:
FRANK GRUBER,
BY
Fred'k C. Fraentzel,
ATTORNEY

UNITED STATES PATENT OFFICE.

FRANK GRUBER, OF NEWARK, NEW JERSEY.

PROPELLING DEVICE FOR VEHICLES.

SPECIFICATION forming part of Letters Patent No. 578,329, dated March 9, 1897.

Application filed February 29, 1896. Serial No. 581,323. (No model.)

*To all whom it may concern:*

Be it known that I, FRANK GRUBER, a citizen of the United States, residing at Newark, in the county of Essex and State of New Jersey, have invented certain new and useful Improvements in Propelling Devices for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in vehicles of that class which are driven by manual power through a system of gearing; and the invention has for its object to provide a simple, durable, and effective machine the operation of which can be readily governed and the machine worked with ease and rapidity.

The invention therefore consists in the general arrangements, construction, and combinations of parts, such as will be hereinafter fully described, and finally embodied in the clauses of the claim.

The invention is clearly illustrated in the accompanying sheets of drawings, in which—

Figure 1:
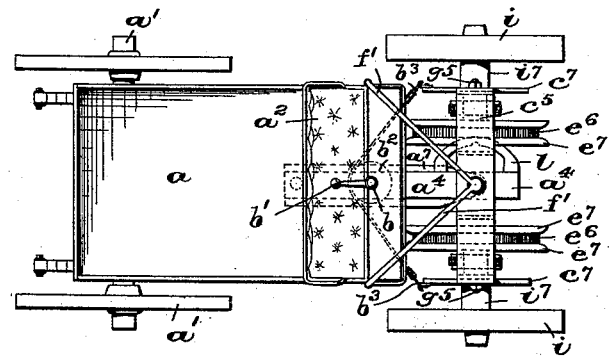
Figure 2:
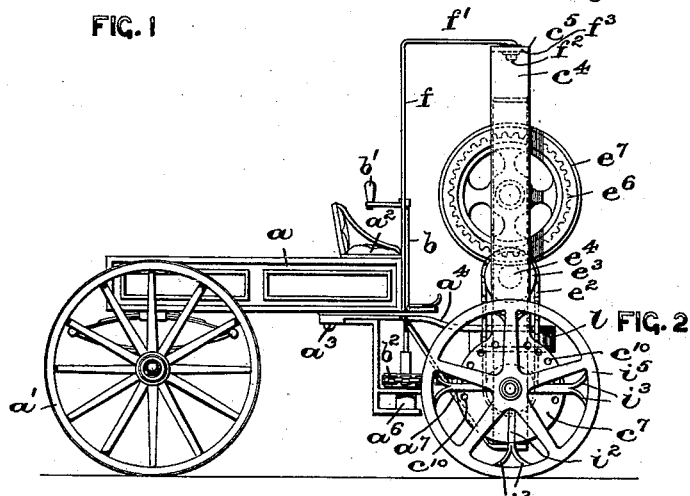
Figure 3:
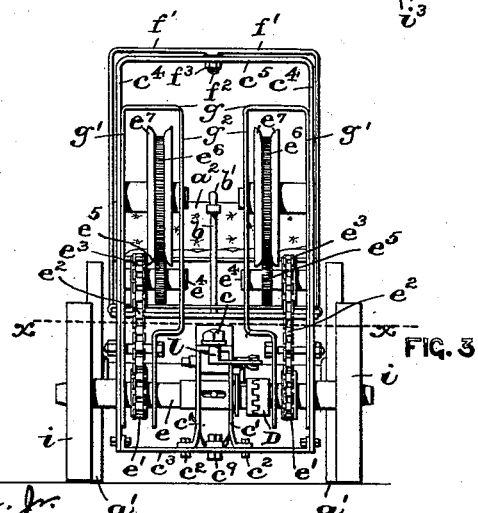

Figure 1 is a plan, and Fig. 2 a side view, of the vehicle embodying the principles of the present invention. Fig. 3 is a front view of the propelling mechanism connected with the vehicle. Figs. 4 and 5 are horizontal sections, taken on line $x$ in Fig. 3, illustrating the propelling mechanism in two different positions—when the vehicle is being propelled in a straight direction and when the vehicle is being propelled on a curve. Fig. 6 is a vertical section, on an enlarged scale, of the forward axle of the vehicle and part of the propelling mechanism, said view illustrating the manner of carrying the wagon-body on hubs connected with the wheels of the vehicle to remove all undue weight directly from the forward axle of the vehicle. Fig. 7 is a side view of one of the forward wheels of the vehicle. Fig. 8 is a side view of a wheel-casing of the construction illustrated in Fig. 7, which is provided on its periphery with small rollers; and Fig. 9 is a cross-section of the same.

Similar letters of reference are employed in all of the above-described views to indicate like parts.

In said drawings, $a$ represents the body of a wagon or other like vehicle, provided with the usual forms of rear wheels $a'$ and a seat $a^2$. Fixed to the under side of the body of the vehicle by means of a bolt $a^3$ is a reach or tongue $a^4$, to which is fastened a suitable supporting-bracket $a^5$, having a pedestal-bearing $a^6$. In said bearing $a^6$ and rotatively arranged in a suitable hole or perforation in the reach or tongue $a^4$ is a steering-rod $b$, provided at the top with a handle $b'$ or the equivalent thereof, and at or near its lower end said rod $b$ is provided with a sprocket-wheel $b^2$, as clearly illustrated in Fig. 2. The front end of the tongue or reach $a^4$ is pivotally connected by means of a screw or bolt $c$ with a suitable support $c'$, secured by means of bolts or screws $c^2$ to a cross-bar $c^3$ of the main frame $c^4 c^5 c^4$ for carrying the propelling mechanism. The side pieces $c^4$ of said frame are provided with annular hubs $c^6$, extending from the sides thereof, which project into suitable hubs or bearing portions $i^7$ on the front wheels of the vehicle, in the manner and for the purposes to be more fully set forth hereinafter. Rotatively, but loosely, arranged in said hubs or bearing portions $i^7$ and extending through the said hubs $c^6$ in the side pieces $c^4$ of the main frame is the front axle $e$ of the vehicle.

The support $c'$, as will be seen from Fig. 6, is provided with certain holes $c^8$, in which I have loosely fitted a sleeve $d$ in sliding contact with the said axle $e$, for the purposes to be more fully set forth hereinafter. As will be seen from Figs. 2, 4, 5, and 6, there is pivotally secured to said cross-bar $c^3$, on a pin or bolt $c^9$, a brace $a^7$, which extends backwardly and upwardly and is secured to the under side of the body of the vehicle. Said frame $c^4 c^5 c^4$ may be braced by means of certain uprights $f$, from which extend suitable arms $f'$, terminating in a pin $f^2$, which extends through a hole in the top bar $c^5$ of the said frame and which is operatively held in said hole by means of a nut $f^3$, as will be clearly seen from Figs. 2 and 3. Secured to said axle $e$ are suitable sprocket-wheels $e'$, over which are passed the link belts $e^2$ or the equivalent thereof, which are in operative mesh with the sprocket-wheels $e^3$, secured on the short shafts $e^4$, and which are rotatively arranged in the frames $g$, as clearly represented in Fig. 3. Said frames $g$ comprise therein the downwardly-extending arms $g'$ and $g^2$, which are perforated at or near their lower ends and are loosely arranged on the axle $e$ in the manner illustrated in said Fig. 6.

In suitable perforations or holes $g^3$ I have arranged the bolts $g^4$, (see Fig. 6,) the ends of which can be inserted through any one of the holes $c^{10}$ in certain enlarged parts $c^7$, extending on opposite sides of the frame portions $c^4$, and are secured in place by means of certains nuts $g^5$. In this manner said frames $g$ can be adjusted and secured at any desirable angle to the front end of the vehicle to suit the wishes of the operator, as will be clearly evident.

On each shaft $e^4$ is a pinion $e^5$ in toothed engagement with the larger gear-wheels $e^6$, also operatively arranged in said frames $g$. Said gear-wheels $e^6$ may be provided with smooth rims $e^7$, which are taken in hand by the person in the vehicle to operate the same; but it will be understood that any other suitable means connected with said gear-wheels may be employed for operating them. When the said wheels $e^6$ are operated, the gear mechanism conveys motion to the axle $e$ and the vehicle can be propelled in a forward or backward direction at the will of the operator and in the manner to be fully described. In order to turn the vehicle in either direction while being propelled, I have secured to said enlarged parts $c^7$ on the frame-pieces $c^4$ a link chain $b^3$, which is in operative mesh with the sprocket-wheel $b^2$ on the rod $b$. By turning this rod in the direction in which it is desired to turn the vehicle said chain acts on the frame $c^4$ $c^5$ $c^4$ and causes a partial rotation of the parts while the vehicle is thus propelled around a curve. As will be seen from Fig. 6, said axle $e$ is made in two parts, each part being operatively held in the bearings in said support $c'$ and the holes in the lower portions of the arms $c^4$ of the main frame by means of suitable collars $j$ and in the bearing portions of the wheels $i$ of the vehicle, said wheels $i$ being operatively held on the hubs $c^6$, hereinabove mentioned, on the main frame by suitable nuts $e^8$ on the free ends of the axle $e$. The said two parts of the axle $e$ are normally connected by means of a clutch D; but when the vehicle passes around a curve or corner then the separable parts of said clutch are automatically disconnected, which allows the outer wheel to move much faster than the inner wheel, passing over the smaller space, and thereby prevents any drag and extra exertion on the part of the operator.

The clutch mechanism consists, essentially, of a sleeve $d$, hereinabove mentioned, loosely mounted on the part E of the axle $e$ and in bearings in the support $c'$, turning with the axle by engagement with a pin $k$, extending laterally from the part E into the longitudinal slot $d'$ in said sleeve. On one end of said sleeve $d$ is a suitable clutch-sleeve $d^2$, which is normally in operative holding engagement with a clutch-sleeve $d^3$ on the part E' of the said front axle of the vehicle. Thus it will be evident that when the vehicle is being propelled in a straight direction the axle $e$ is practically continuous; but as soon as the main frame $c^4$ $c^5$ $c^4$ and hence the axle $e$ are caused to be turned to either side on their pivotal support on the reach or tongue $a^4$ of the vehicle a spring-actuated arm or post $d^4$, having in its forward end a small wheel $d^5$ in sliding engagement with a cam-sector $l$, secured to one side of the reach or tongue $a^4$, is forced from a notch or cut-away portion $l'$ in said sector, and as it slides along the edge $l^2$ of the sector (see Fig. 5) the spring-actuated arm or post $d^4$ moves slightly backward in its bearing in the support $c'$. At the same time a downwardly-extending finger $d^6$, which extends into an annular groove $d^7$ on the clutch-sleeve $d^2$, causes the sleeve $d$ to move on the axle portion E in the direction of the arrow shown in said Fig. 6, thus causing the disengagement of the two clutch-sleeves and allowing the independent rotation of the now separated parts E and E' of the axle $e$, as will be clearly understood. As soon as the axle $e$ and the other parts have been returned to their original positions, when the vehicle is being propelled in a straight direction, said spring-actuated arm or post $d^4$ causes the wheel thereon to return into the notch or cut-away part $l'$ on the sector $l$, and the two clutch-sleeves are again brought into their operative holding engagement, resulting in a practically continuous axle $e$. The front wheels $i$ may be of the ordinary construction; but the special construction of wheel illustrated more especially in Fig. 7 is the preferred form. Arranged on the free end of the said axle $e$ are the hubs $i'$, from which extend suitable arms or sprockets $i^2$, which terminate in oppositely-projecting spurs $i^3$. On the hub of each wheel is a suitable shell forming a cylindrical casing $i^4$, having the annular rim or flange $i^5$. Secured to said rim is a second disk $i^6$, having a central opening, in which the end of the said axle $e$ is loosely arranged and is secured in place by the nut $e^8$ on the end thereof, as hereinabove stated. On the inner surface of the said rim or flange $i^5$ I have secured suitable projections or stops $i^8$, between which the forked ends of the spokes or arms $i^2$ are arranged in order to form an intervening space between the ends of said spurs $i^3$ and the ends of said stops $i^8$, as will be clearly evident from an inspection of Fig. 7. As soon as the axle $e$ is operated by means of the hereinabove-described propelling mechanism and begins to rotate freely in its bearings the spurs $i^3$ are forcibly brought against the end of the stops $i^8$, as indicated in dotted outline in said Fig. 7, thereby resulting in applying the power directly to the outer rim of the wheel, which helps considerably in starting the vehicle, resulting in a gain, as will be clearly evident.

As will be seen from Figs. 8 and 9, the cylindrical face $i^5$ of the wheel-casing may be provided with an annular rim $i^9$, and the plate $i^6$ is also provided with a correspondingly-arranged rim $i^{10}$, (see more particularly Fig. 9,) each rim being provided with oppositely-arranged holes in which rotate the journal-pins $m'$ of suitable antifriction-rollers $m$.

Of course it will be evident that I may employ suitable balls in place of the rollers $m$, in which case the two rims $i^9$ and $i^{10}$ are suitably constructed to retain said balls operatively in rolling contact with said cylindrical surface of the wheel-casing $i^5$, as will be clearly understood.

My novel form of vehicle is simple and durable in its construction and efficient when in use, being built to carry one or more persons and heavy loads.

Of course it will be evident that many changes may be made in the details of construction and combinations of parts without departing from the scope of my present invention, as, for instance, the gear-wheels $e^3$ and $e^5$ and the link chains $e^2$ may be entirely dispensed with and the construction altered so that the wheels $e'$ can be made to mesh directly with the large gear-wheels $e^6$.

Having thus described my invention, what I claim is—

1. In a vehicle of the class herein set forth, the combination, with the body and a reach or tongue extending therefrom, of a frame pivotally connected with said reach or tongue, wheels, as $i$, having hubs which carry said frame, annular rims $i^5$ and stops $i^8$, an axle loosely arranged in bearings in said frame, a propelling mechanism connected with said axle, and spider-arms $i^2$ at or near the free ends of said axle, adapted to engage with said stops $i^8$, substantially as and for the purposes set forth.

2. In a vehicle of the class herein set forth, the combination, with the body and a reach or tongue extending therefrom, of a main frame pivotally connected with said reach or tongue, an axle rotatively arranged in bearings on said frame, a frame $g$ pivotally arranged on said axle and adjustably connected with the main frame, and an operating mechanism in said frame $g$, substantially as and for the purposes set forth.

3. In a vehicle of the class herein set forth, the combination, with the body and a reach or tongue extending therefrom, of a main frame pivotally connected with said reach or tongue, an axle consisting of two parts rotatively arranged in bearings in said frame, a clutch for connecting said parts of the axle, consisting of a clutch-collar on each axle-section, a cam-sector on said reach or tongue, and a spring-actuated post or arm for automatically operating one of said clutch-collars, and an operating-gear mechanism connected with said main frame and geared with said axle, substantially as and for the purposes set forth.

4. In a vehicle, in combination, with an axle, a wheel $i$, comprising, a hub having suitable arms $i^2$, a wheel-casing $i^4$, loosely arranged on said hub, having a flange $i^5$ and stops or projections thereon, with which the free ends of said arms $i^2$ can be brought into operative engagement, substantially as and for the purposes set forth.

5. In a vehicle, the combination, with an axle, a wheel $i$ comprising, a hub having suitable arms $i^2$, a wheel casing $i^4$ loosely arranged on said hub, annular rims thereon, a flange $i^5$, and stops or projections on said flange with which the free ends of said arms can be brought into operative engagement, and antifriction-rollers between said rims and on the outer peripheral surface of said flange $i^5$, all, substantially as and for the purposes set forth.

6. In a vehicle of the class herein set forth, the combination, with the body and a reach or tongue extending therefrom, of a main frame pivotally connected with said reach or tongue, an axle, a frame $g$ on said axle, and means on said main frame for adjustably connecting said main frame with the frame $g$, consisting, of bolts $g^4$ adapted to be arranged in perforations in the frame $g$ and in perforations $c^{10}$ in the main frame, and an operating mechanism in said frame $g$, substantially as and for the purposes set forth.

In testimony that I claim the invention set forth above I have hereunto set my hand this 21st day of February, 1896.

FRANK GRUBER.

Witnesses:
 FREDK. C. FRAENTZEL,
 WM. H. CAMFIELD, Jr.